(12) United States Patent
Yoshida

(10) Patent No.: US 7,578,145 B2
(45) Date of Patent: Aug. 25, 2009

(54) DEVICE AND METHOD FOR MANUFACTURING GLASS PREFORMS FOR OPTICAL ELEMENTS

(75) Inventor: Masahiro Yoshida, Hidaka (JP)

(73) Assignee: Hoya Corporation, Tokyo (JP)

( * ) Notice: Subject to any disclaimer, the term of this patent is extended or adjusted under 35 U.S.C. 154(b) by 210 days.

(21) Appl. No.: 11/357,183

(22) Filed: Feb. 21, 2006

(65) Prior Publication Data
US 2006/0283209 A1 Dec. 21, 2006

(30) Foreign Application Priority Data
Feb. 23, 2005 (JP) .............................. 2005-046538

(51) Int. Cl.
C03B 9/16 (2006.01)
C03B 7/00 (2006.01)
C03B 9/20 (2006.01)

(52) U.S. Cl. ............................................ 65/208; 65/66
(58) Field of Classification Search ...................... 65/66, 65/122–123, 207, 209, 157, 32.1
See application file for complete search history.

(56) References Cited

U.S. PATENT DOCUMENTS
2003/0000252 A1* 1/2003 Yoshikuni et al. ............... 65/61

FOREIGN PATENT DOCUMENTS
JP 01157425 A 6/1989
JP 03252322 A 11/1991
JP 08245223 A 9/1996

OTHER PUBLICATIONS
Japanese Office Action dated Jan. 27, 2009.
* cited by examiner Primary Examiner—Steven P Griffin
Assistant Examiner—Jodi Cohen
(74) Attorney, Agent, or Firm—Sughrue Mion, PLLC

(57) ABSTRACT

The devices for manufacturing glass performs comprise multiple gob casting molds, devices for displacing the gob casting molds and an atmosphere regulating mechanism. In one aspect, the atmosphere regulating mechanism independently regulates an atmosphere to which the glass is exposed on the gob casting molds in the casting area, molding area, or removal area relative to an atmosphere of at least one other area. In a second aspect, the atmosphere regulating mechanism divides the molding area into multiple subareas, and independently regulates an atmosphere to which the glass on the gob casting molds is exposed in at least one of the multiple subareas relative to the atmosphere in at least one other subarea and/or at least one other area.

14 Claims, 3 Drawing Sheets

DEVICE AND METHOD FOR MANUFACTURING GLASS PREFORMS FOR OPTICAL ELEMENTS

CROSS-REFERENCE TO RELATED APPLICATIONS

This application claims benefit of priority under 35 USC 119 to Japanese Patent Application No. 2005-046538 filed on Feb. 23, 2005.

TECHNICAL FIELD

The present invention relates to devices and methods for manufacturing glass preforms employed in the manufacturing of high-quality optical elements, and to a method for manufacturing optical elements from glass preforms manufactured by these devices or methods.

BACKGROUND ART

With the widespread popularity of various image-pickup devices such as digital cameras and cellular phones with cameras, demand for the glass lenses employed in these devices is increasing. In such devices, there is a need to pick, up high-quality images with a small number of aspherical lenses or small lenses. Glass precision press molding methods are employed to provide such lenses with high productivity.

In precision press molding, a premolded product called a preform is prepared from a quantity of high-quality glass equal to that of a press molded product. The preform is heated and pressed in a pressing mold to precisely transfer the molding surface of the pressing mold to the glass. The productivity of this method is affected by the productivity of the preform manufacturing step in addition to the productivity of the precision press molding step.

Generally, in preform manufacturing methods, a glass melt is caused to flow into a casting mold to form a glass block, after which the glass block is cut into glass pieces and the glass pieces are ground and polished in what is known as a cold processing method, or a glass melt gob the size of one preform is separated from a glass melt and the glass is molded into a preform in a cooling process in what is known as a hot molding method (see Japanese Unexamined Patent Publication (KOKAI) No. 2003-40632). Since preforms are directly manufactured from glass melt in hot molding methods, these methods afford better productivity than cold processing methods.

As stated above, hot molding methods are advantageous methods. However, they require greater technical ability than cold processing methods. For example, when molding preforms of ultralow dispersion fluorophosphate glass, the fluorine in the glass reacts with the atmosphere and vaporizes when the temperature of the glass is elevated during molding, sometimes producing striae in the surface of the preform. When a lens is molded from such a preform, an optically heterogeneous portion is produced in the surface of the lens, compromising the performance of the lens. In glass containing alkali metal components or $B_2O_3$, when elevated temperature is employed in the course of causing the glass melt to flow, volatization of the alkali metal or $B_2O_3$ component generates striae in the preform. It is necessary to employ various measures suited to the glass to reduce striae in order to resolve this problem of reduced preform productivity due to the generation of striae.

The present invention, devised to solve the above-stated problem, has for its object to provide methods and devices for manufacturing glass preforms with reduced striae by hot molding methods.

A further object of the present invention is to provide a method for manufacturing optical glass elements permitting the manufacturing of high-quality glass elements by precision press molding of the glass preforms with reduced striate obtained using the above devices and methods.

DESCRIPTION OF THE INVENTION

The first aspect of the present invention relates to a device for manufacturing glass preforms, comprising multiple gob casting molds, devices for displacing said gob casting molds and an atmosphere regulating mechanism wherein said multiple gob casting molds are moved sequentially through an area where glass melt is cast in a gob casting mold (referred to as the "casting area" hereinafter), an area where the cast glass melt is cooled while being held on a gob casting mold to mold a glass preform (referred to as the "molding area" hereinafter), and an area in which the molded glass preform is removed from the gob casting mold (referred to as the "removal area" hereinafter); are circulated back to the casting area; and during said movement, each of the steps of casting said glass melt, molding said glass melt into glass preforms, and removing the glass preforms is sequentially repeated by each gob casting mold to mass produce glass preforms; and wherein said atmosphere regulating mechanism independently regulates the atmosphere to which the glass is exposed on the gob casting molds in said casting area, molding area, or removal area relative to the atmosphere of at least one other area.

In the above first aspect, the area in which the atmosphere can be independently regulated is the molding area.

In the above first aspect, the area in which the atmosphere can be independently regulated is the casting area.

In the above first aspect, the area in which the atmosphere is independently regulated can be the removal area.

The second aspect of the present invention relates to a device for manufacturing glass preforms, comprising multiple gob casting molds, devices for displacing said gob casting molds and an atmosphere regulating, wherein said multiple gob casting molds are moved sequentially through an area where glass melt is cast in a gob casting mold (referred to as the "casting area" hereinafter), an area where the cast glass melt is cooled while being held on a gob casting mold to mold a glass preform (referred to as the "molding area" hereinafter), and an area in which the molded glass preform is removed from the gob casting mold (referred to as the "removal area" hereinafter); are circulated back to the casting area; and during said movement, each of the steps of casting said glass melt, molding said glass melt into glass preforms, and removing the glass preforms is sequentially repeated by each gob casting mold to mass produce glass preforms; and wherein said atmosphere regulating mechanism divides said molding area into multiple subareas, and independently regulates the atmosphere to which the glass on the gob casting molds is exposed in at least one of said multiple subareas relative to the atmosphere in at least one other subarea and/or at least one other area.

In the above second aspect, the atmosphere regulating mechanism independently can regulate the atmosphere to which the glass on the gob casting mold is exposed in each of said subareas.

The devices of the first and second aspect can further comprise:

housing covers with openings at the top, moving together with each of said casting molds when housing said gob casting molds;

an upper cover, covering the openings of said housing covers to increase the air-tightness within said housing covers in said subarea and/or area the atmosphere of which is independently regulated; and a gas feeding device feeding a gas atmosphere into the interior of said housing covers.

In this device, it is preferred that the height of the housing covers is set so that during movement of the gob casting molds, the height of the opening in the housing cover is maintained constant; and as the gob casting mold moves, the housing cover slides along the bottom surface of said upper cover, maintaining air-tightness within the housing cover in the subarea and/or area the atmosphere of which is independently regulated.

The third aspect of the present invention relates to a method for manufacturing glass preforms, in which multiple gob casting molds are moved sequentially through an area where glass melt is cast in a gob casting mold (referred to as the "casting area", hereinafter), an area where the cast glass melt is molded into a glass preform on a gob casting mold (referred to as the "molding area" hereinafter), and an area in which the molded glass preform is removed from the gob casting mold (referred to as the "removal area" hereinafter); are circulated back to the casting area; and during said movement, each of the steps of casting said glass melt, molding said glass melt into glass preforms, and removing the glass preforms is sequentially repeated by each gob casting mold to mass produce glass preforms; wherein an atmosphere to which the glass is exposed on the gob casting molds in said casting area, molding area, or removal area is independently regulated relative to the atmosphere of at least one other area.

In the third aspect, the area in which the atmosphere can be independently regulated is the casting area.

In the third aspect, the area in which the atmosphere can be independently regulated is the molding area.

In the third aspect, the area in which the atmosphere can be independently regulated is the removal area.

The fourth aspect of the present invention relates to a method for manufacturing glass preforms, in which multiple gob casting molds are moved sequentially through an area where glass melt is cast in a gob casting mold (referred to as the "casting area" hereinafter), an area where the cast glass melt is molded into a glass preform on a gob casting mold (referred to as the "molding area" hereinafter), and an area in which the molded glass preform is removed from the gob casting mold (referred to as the "removal area" hereinafter); are circulated back to the casting area; and during said movement, each of the steps of casting said glass melt, molding said glass melt into glass preforms, and removing the glass preforms is sequentially repeated by each gob casting mold to mass produce glass preforms; wherein said molding area is divided into multiple subareas, and the atmosphere to which the glass on the gob casting molds is exposed in at least one of said multiple subareas is independently regulated relative to the atmosphere in at least one other subarea and/or at least one other area.

In the fourth aspect, it is preferred that the atmosphere regulation is conducted by independently regulating the atmosphere to which the glass on the gob casting mold is exposed in each subarea.

The fifth aspect of the present invention relates to a method for manufacturing optical elements in which a glass preform manufactured using the device of the first or second aspect of the present invention, or a glass preform manufactured by the method for manufacturing glass preforms of the third or fourth aspect of the present invention, is heated and precision press molded.

According to the present invention, glass preforms with reduced striae can be manufactured by hot pressing methods. Further, according to the present invention, the glass preforms with reduced striae can be employed to manufacture high-quality optical elements.

BEST MODE OF IMPLEMENTING THE INVENTION

Figure 1:
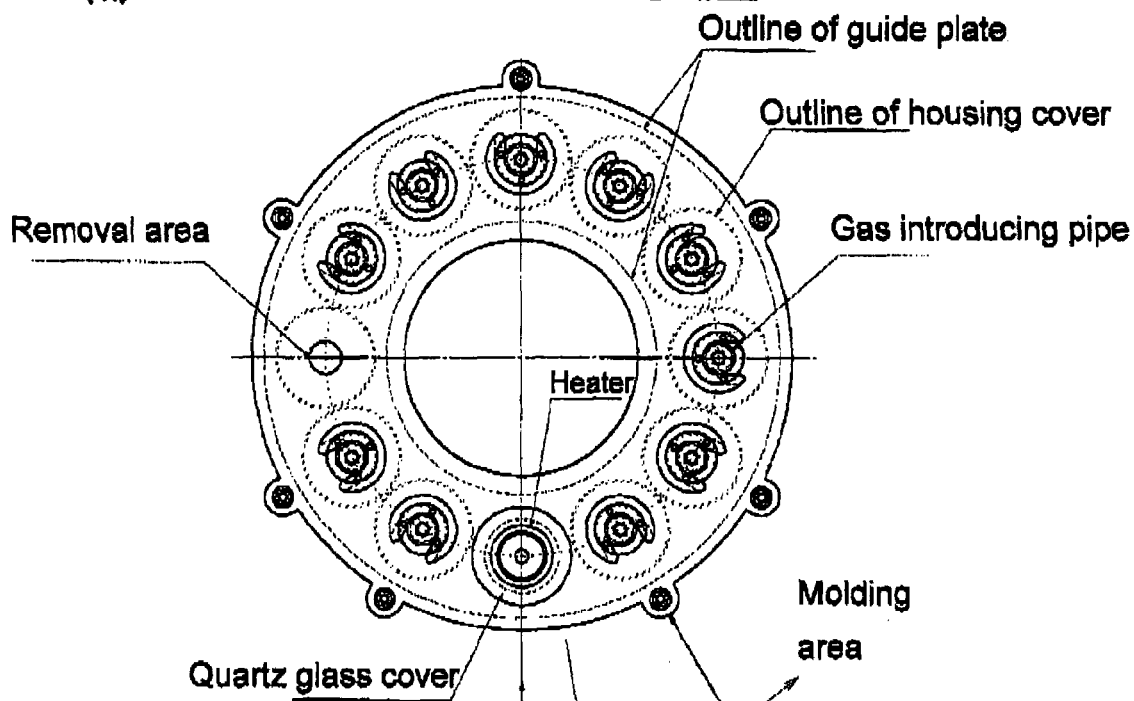
FIG. 1(a) is a plan view of a molding device in which a guide plate and an upper cover are installed on a turntable, with rotation drive mechanism, on which are positioned gob casting molds.
FIG. 1(b) is a side view showing the general appearance of the nozzle and a gob casting mold stopping temporarily in the casting area.
FIG. 1(c) is a side view showing the general appearance of a gob casting mold stopping temporarily at a section in the molding area, and the periphery thereof.
Figure 1:
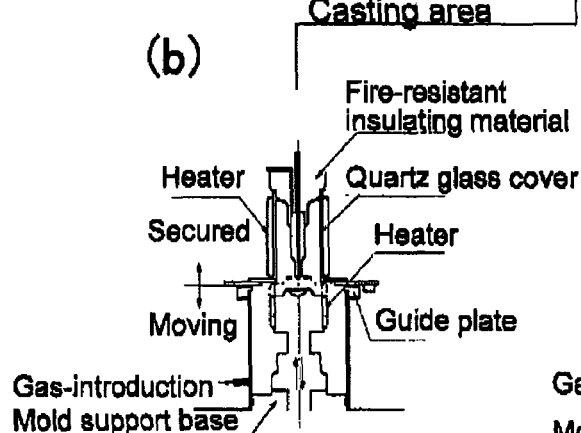
Figure 1:
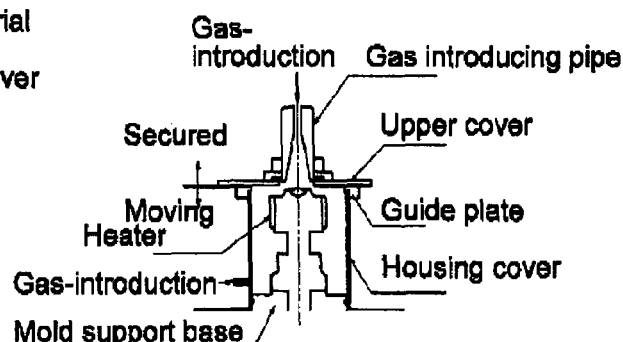

The present invention is described in greater detail below.

[Device for Manufacturing Glass Preforms]

The first device for manufacturing glass preforms of the present invention (also referred to as "Device 1" hereinafter):

is a device for manufacturing glass preforms, comprising multiple gob casting molds, devices for displacing said gob casting molds and an atmosphere regulating mechanism, wherein said multiple gob casting molds are moved sequentially through a casting area where glass melt is cast in a gob casting mold, a molding area where the cast glass melt is cooled while being held on a gob casting mold to mold a glass preform, and a removal area in which the molded glass preform is removed from the gob casting mold; are circulated back to the casting area; and during said movement, each of the steps of casting said glass melt, molding said glass melt into glass preforms, and removing the glass preforms is sequentially repeated by each gob casting mold to mass produce glass preforms; and wherein the atmosphere regulating mechanism that independently regulates the atmosphere to which the glass is exposed on the gob casting molds in said casting area, molding area, or removal area relative to the atmosphere of at least one other area.

The second device for manufacturing glass preforms of the present invention (also referred to as "Device 2" hereinafter):

is a device for manufacturing glass preforms, comprising multiple gob casting molds, devices for displacing said gob casting molds and an atmosphere regulating mechanism, wherein said multiple gob casting molds are moved sequentially through a casting area where glass melt is cast in a gob casting mold, a molding area where the cast glass melt is cooled while being held on a gob casting mold to mold a glass preform, and a removal area in which the molded glass preform is removed from the gob casting mold; are circulated back to the casting area; and during said movement, each of the steps of casting said glass melt, molding said glass melt into glass preforms, and removing the glass preforms is sequentially repeated by each gob casting mold to mass produce glass preforms; and wherein the atmosphere regulating mechanism that divides said molding area into multiple subareas and independently regulates the atmosphere to which the glass on the gob casting molds is exposed in at least one of said multiple subareas relative to the atmosphere in at least one other subarea and/or at least one other area.

In the present invention, "regulation of the atmosphere" means regulating the type of gas atmosphere, the partial pressures of each of the gases constituting a mixed gas, or the pressure of the atmosphere to achieve a desired state.

Both Device 1 and Device 2 are devices for manufacturing glass preforms equipped with multiple gob casting molds and devices moving the gob casting molds. The multiple gob casting molds sequentially pass through an area where glass melt is cast in a gob casting mold (casting area), an area where the cast glass melt is cooled while being held on a gob casting mold to mold a glass preform (molding area), and an area in which the molded glass preform is removed from the gob casting mold (removal area); are circulated back to the casting area; and are moved. During this movement, each of the steps of casting the glass melt, molding it into glass preforms, and removing the glass preforms is sequentially repeated by each gob casting mold to mass produce glass preforms. When manufacturing glass preforms by such a hot molding method, there is a risk of volatilization of volatile components producing surface striae in the glass preforms. To reduce surface striae, it is desirable to conduct molding in an atmosphere in which volatile components do not readily volatize (such as a high-pressure nitrogen atmosphere). However, for example, when the entire device for manufacturing glass preforms is enclosed in an atmosphere adjustment chamber and the pressure within the chamber is raised, the flow of glass melt from the nozzle is impeded and casting of glass melt becomes difficult. Further, when the entire device is housed in an atmosphere adjustment chamber and the atmosphere is regulated as set forth above, the atmosphere in the chamber is exposed to the external atmosphere when the glass preforms are removed. Once the atmosphere regulation has been removed in the chamber in this manner, a tedious operation to restore regulation of the atmosphere within the chamber becomes necessary, compromising productivity.

Accordingly, Device 1 is equipped with an atmosphere regulating mechanism that independently regulates the atmosphere to which the glass on the gob casting mold is exposed in the casting area, molding area, or removal area relative to the atmosphere in at least one other area. This permits regulation of the molding area, for example, to achieve an atmosphere capable of inhibiting volatization in a manner independent of the other areas (the casting area and removal area), permitting the highly productive manufacturing of glass preforms with reduced striae.

In Device 1, the area the atmosphere of which is independently regulated can be the molding area, casting area, and/or removal area. To reduce striae, independent regulation of the atmosphere in the molding area relative to the other areas is particularly desirable. Further, the casting areas is desirably regulated to achieve an atmosphere suited to casting. The removal area can be regulated to achieve an atmosphere suited to removal, or can be open to the external atmosphere, as set forth further below.

Device 2, is equipped with an atmosphere regulating mechanism independently regulating the atmosphere to which the glass on the gob casting mold is exposed in at least one of the subareas into which the casting area is divided relative to the atmosphere of at least one other area or subarea. Thus, each subarea, into which the atmosphere to which the glass is exposed is subdivided in the casting area, can be independently regulated and variation in the atmosphere of the molding area due to the mixing in of gas atmospheres and the like from areas (the casting area or removal area) other than the molding area can be avoided. To reduce striae, it is particularly desirable to independently regulate the atmosphere to which the glass on the gob casting mold is exposed for each subarea in Device 2.

By independently regulating the atmosphere of at least one area or subarea in the molding device relative to other areas or subareas, the volume of gas exchanged can be more greatly reduced and the gas atmosphere can be replaced more quickly than when the entire molding device is enclosed in a chamber for atmosphere regulation and the atmosphere is regulated.

When a common atmosphere is employed in the casting area and molding area and the pressure of the gas atmosphere of the molding area is increased, the pressure of the gas atmosphere in the casting area also increases. As a result, the pressure exerted on the glass melt in the pipe or nozzle also increases, causing the flow rate of the glass melt to deviate from the setting value. When the flow rate changes, there are sometimes problems in that the glass flow sometimes devitrifies or the weight of the glass preforms becomes skewed. By contrast, based on the present invention, since the pressure of the gas atmosphere in the casting area is kept within a range suited to the flowing of glass independently from the molding area, devitrification of the glass and reduction of the weight precision of the glass can be prevented even when the pressure of the gas atmosphere in the molding area is increased to reduce striae.

Further, a gas other than air, such as a dry gas or nitrogen gas, can be employed as the atmosphere of the molding area, and removal of the glass preform from the gob casting mold can be conducted in air, permitting the manufacturing of glass preforms without compromising efficiency.

Specific embodiments of Devices 1 and 2 will be described next based on the drawings. However, the present invention is not limited to these embodiments.

Figure 3:
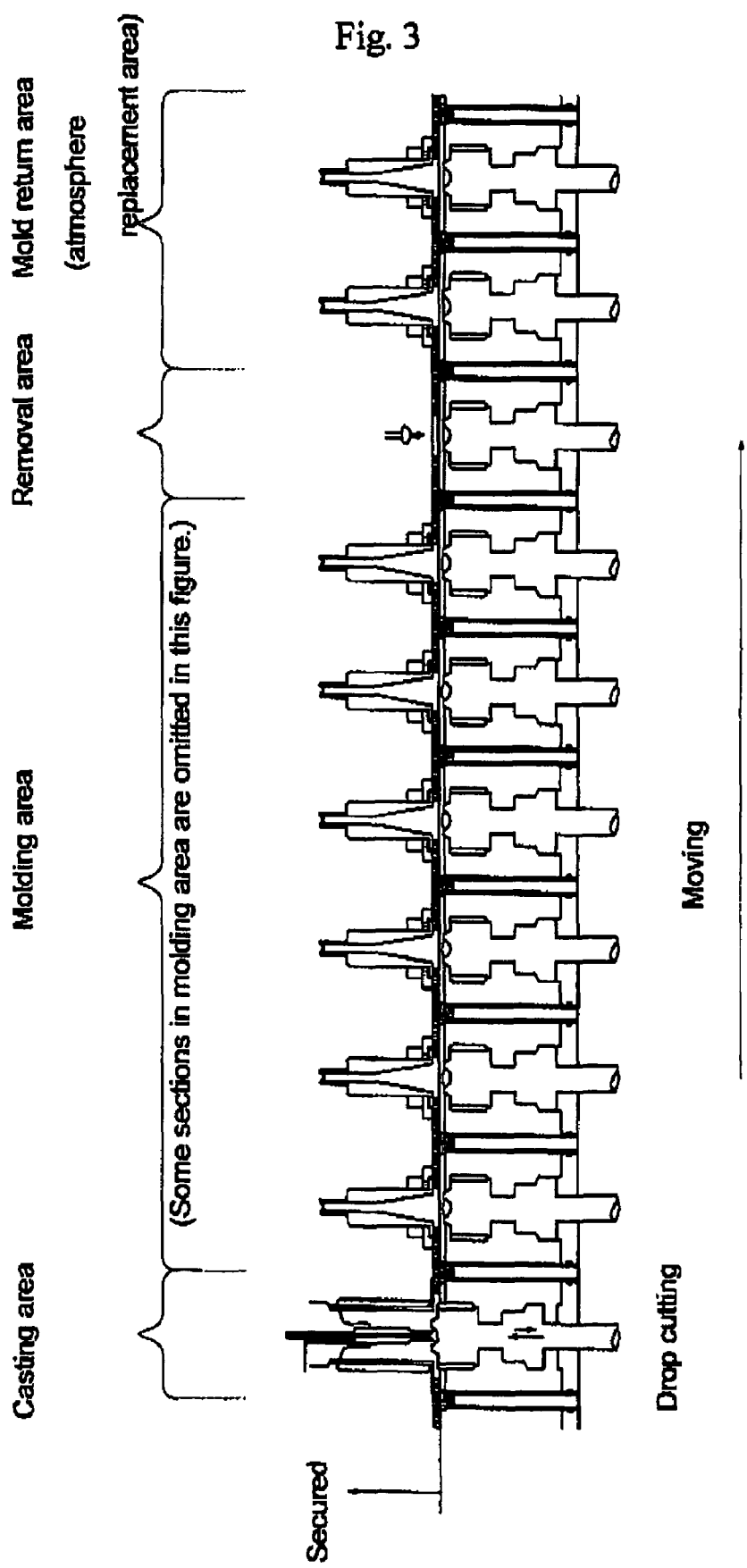
FIG. 3 shows a horizontally extended sectional view of the device of FIG. 1.

FIG. 1(*a*) is a plan view of a molding device in which a guide plate and an upper cover are installed on a turntable, equipped with rotation drive mechanism, on which are positioned gob casting molds (referred to as the "table" hereinafter). FIG. 1(*b*) is a side view showing the general appearance of the nozzle and a gob casting mold stopping temporarily in the casting area. FIG. 1(*c*) is a side view showing the general appearance of a gob casting mold stopping temporarily at a section in the molding area, and the periphery thereof FIG. 3 shows a horizontally extended sectional view of the device of FIG. 1. However, the molding area section is partially omitted from FIG. 3. In the device shown in FIG. 1, the rotation drive mechanism rotates the table in indexed fashion. In indexed rotation, gob casting molds on the table are identically moved to temporary stopping positions (referred to as "sections" hereinafter) identical in number to the number of gob casting molds on the table, temporarily stopping for a prescribed period. Subsequently, the table is rotated in a single direction so that the operation of simultaneously moving the gob casting molds to the next temporary stopping position is sequentially conducted. One of multiple sections is designated as the casting area and another as the removal area. At least part of the travel route of a gob casting mold from the casting area to the removal area in the direction of rotation of the table corresponds to the molding area. The number of sections between the casting area and the removal area in the direction of rotation of the table is desirably set so that before the glass preform arrives at the removal area, it is cooled to a state where it will not be deformed by external forces in the course of removal from the gob casting mold.

Figure 2:
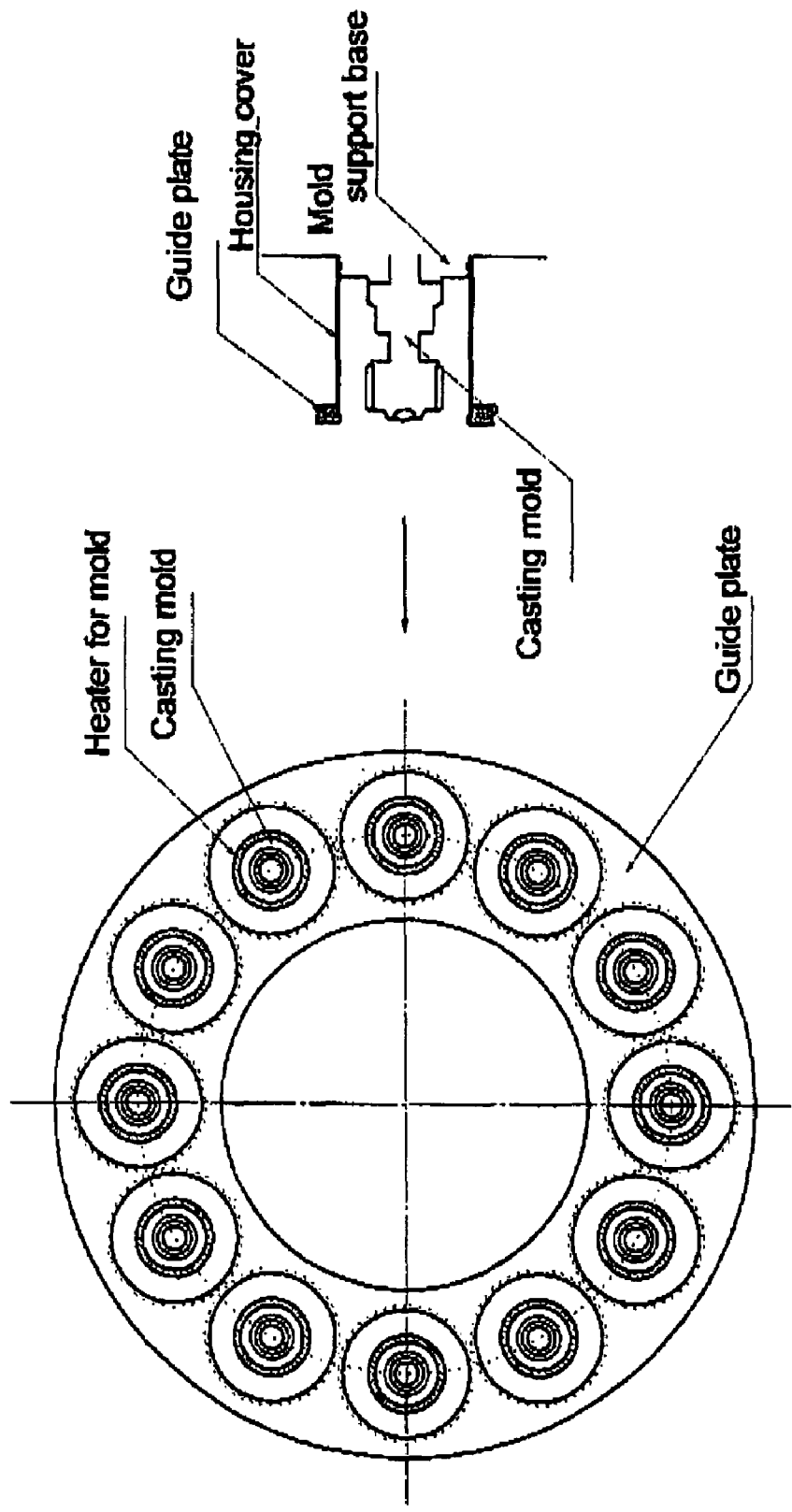
FIG. 2 is a schematic diagram showing the upper cover removed from the device of FIG. 1.

In the device shown in FIG. 1, a guide plate and an upper cover are installed on the table in that order. FIG. 2 shows a schematic diagram (with the guide plate exposed) of the device with the cover removed. The guide plate moves in a manner following the indexed rotation of the table, while the upper cover is fixed and does not move even when the table undergoes indexed rotation. Thus, as is set forth further below, an airtight state can be maintained within the housing cover even when the gob casting molds are moving. As shown in FIG. 2, a mold heater is positioned within the housing cover, permitting regulation of the temperature of the gob casting molds.

A pipe, through which glass melt flows downward from a container accumulating clarified and homogenized glass melt, and a nozzle, corresponding to the lower end portion of the pipe, are positioned above the casting area section. As shown in FIG. 1(b), the two are positioned so that the nozzle flow outlet through which the glass melt flows is positioned vertically above the center of a concave member of the gob casting mold stopping temporarily in the casting area. The concave member of the gob casting mold receives glass melt and stably transports it, performing the function of a molding element molding the glass preform.

In the mode shown in FIG. 1, the lateral surface of the flow pipe is enveloped in insulating material and a cylindrical cover comprised of quartz glass is positioned in the lower portion of the insulating material to house the nozzle (see FIG. 1(b)). A heater (high frequency coil) is wound around the exterior of the quartz glass cover. A high-frequency electric current is run through the coil, thereby heating the platinum alloy nozzle and lower portion of the pipe by high-frequency induction. In this manner, the atmosphere of the casting area can be independently regulated relative to the atmosphere of other areas.

In the present mode, a housing cover moving with the above-described casting mold is provided for each gob casting mold in a manner housing the gob casting mold as shown in FIG. 1(b). The upper portion of the housing cover is in the form of an opening and there are inlets for gas atmosphere on the lateral surfaces thereof. The lower edge of the housing cover is tightly secured by an O-ring or the like to the lower lateral surface of the support base of the gob casting mold, which supports the gob casting mold and is secured to the table. The airtight state of the interior of the housing cover is maintained by plugging the upper opening in the housing cover.

The device for manufacturing glass preforms of the present mode is equipped with an upper cover above the guide plate as shown in FIG. 1(b). This upper cover is a doughnut-shaped disk in which multiple openings are positioned in a single circle. The bottom surface of the disk is positioned horizontally and secured. Gas introducing pipes can be installed in the openings of the upper cover. Windows permitting observation of the interior can also be provided. Or, for example, it is possible to install neither of these and leave the openings open in the removal area. Here, the height of the housing cover is set so that the height of the individual openings of the housing cover is kept constant during movement of the gob casting molds so that all of the upper openings in the housing covers move within a single plane when the housing covers are moved together with the gob casting molds. In this manner, when the housing covers move, the openings in the housing covers are always covered, making it possible to maintain a good airtight state within the housing covers in the area or subarea in which the atmosphere is independently regulated. Based on this configuration, it is possible to subdivide the molding area and independently regulate each of the sections in which the atmosphere to which the glass is exposed is divided. Further, mixing of air into the atmosphere to which the glass is exposed can be prevented during movement to the next section.

In the above-described mode, in the course of moving the housing covers, the openings of the housing covers slide across the bottom surface of the disk, that is, across the bottom surface of the upper cover, so the openings slide across the interior of the underside of the upper cover. A seal member is desirably mounted on the underside of the upper cover and/or on the sliding portions of the housing covers to achieve smooth sliding and prevent loss of an airtight state within the housing covers due to sliding. For example, the housing covers and the upper cover can be made of stainless steel and an aluminum seal can be mounted in the openings of the housing covers to achieve smooth sliding and prevent loss of an airtight state within the housing covers during sliding.

To achieve more stable sliding and maintain a highly airtight state, a guide plate with a flat upper surface (for example, a doughnut-shaped disk) having a number of openings corresponding to the number of gob casting molds with a housing cover opening flange mounted in each opening is desirably provided. The guide plate moves with the housing cover. The upper surface of the guide plate undergoes indexed rotation in a manner maintaining surface contact with the flat surface containing all of the upper openings of the housing covers, thereby making it possible to maintain a highly airtight state. The guide plate may also serve as the above-described seal member.

As shown in FIG. 1(c), in the molding area, the above-described housing covers enclose the exteriors of the gob casting molds and the openings of the housing covers are covered by the upper cover to enhance the airtight state of the interior of the housing covers. As set forth above, the upper cover does not move with the gob casting molds and is secured. To feed gas to the interior of a housing cover—that is, into the space covered by the housing cover and the upper cover—gas introducing pipes can be provided at the positions at which the casting molds of the upper cover temporarily stop.

In the mode of FIG. 1, as shown in FIG. 1(c), a gas introducing pipe is positioned vertically above the concave member of the gob casting mold that stops temporarily, with the concentration of the gas atmosphere being greatest in the vicinity of the glass during molding. Further, the gas atmosphere can be blown onto the glass to promote cooling of the glass. In the mode shown in FIG. 1(c), the inner diameter of the gas introducing pipe widens in the direction of the gas atmosphere feed opening. As is set forth further below, gas is blown out through the concave member of the gob casting mold to exert upward wind pressure on the glass during molding, floating or intermittently floating the glass on the concave member. In such a state, when the gas atmosphere is strongly blown at the glass, the floating state becomes unstable; this is undesirable from the perspective of obtaining high-quality glass preforms. Configuring the inner diameter of the gas introducing pipe as set forth above is desirable in that it does not destabilize the floating state of the glass.

In the device shown in FIG. 1, the upper cover does not cover the top of the gob casting mold in the casting area section. However, the lower edge of the above-described cylindrical cover comprised of quartz glass is mounted on the opening of the disk of the upper cover to enhance the airtight state in the interior of the housing cover in the casting area section. Although not shown, the configuration is such that gas atmosphere introducing holes are present in the cylindrical cover, it being possible to feed the gas atmosphere from the cover side as well.

In the device shown in FIG. 1, since the top of the gob casting mold is not covered by the upper cover during temporary stops in the removal area section, the glass preform can be smoothly removed. To prevent air from flowing into the removal area, for example, a shutter linked to removal of the glass preform can be provided.

In the area from the removal area to the casting area in the direction of rotation of the table (referred to as the "mold return area" hereinafter), the gob casting mold and top of the housing cover can be covered by the upper cover to enhance the airtight state in the interior of the housing cover. A configuration in which gas atmosphere is introduced into the interior of the housing cover in the casting area and the airtight seal in the interior of the housing cover is broken in the removal area is particularly effective. In that case, as shown in FIG. 3, an upper cover with gas introducing pipe can be provided in the mold return area to enhance the airtight state inside the housing cover, and a gas identical to the gas atmosphere introduced into the housing cover in the casting area can be introduced in large quantity into the interior of the housing cover. This shortens the time required to replace the gas atmosphere in the interior of the housing cover in the casting area.

In methods of molding glass preforms in a process of cooling glass from a glass melt, glass in a molten state is generally rapidly cooled so that it does not devitrify. Further, there is a limitation in that the glass melt must flow continuously out of a nozzle. Accordingly, when continuously flowing glass melt is not received by an empty gob casting mold in the casting area, casting is not possible based on the glass outflow. The rapid conveying of gob casting molds into and out of the casting area is difficult. According to the device of the present invention, the atmosphere of the casting area and the molding area can be independently regulated even when rapidly conveying gob casting molds in and out, permitting the mass production with good productivity of glass preforms with reduced striae.

To incase the degree of freedom of atmosphere regulation, gas introducing pipes are desirably mounted on the upper cover and housing covers in each section from the casting area to the removal area in the direction of rotation of the table. It is also desirable to provide upper covers and mount gas introducing pipes on each upper cover in all sections other than the casting area and removal area. Gas atmosphere feeding devices supplying suitable different gas atmospheres can be provided on these gas introducing pipes, or the same gas atmosphere can be fed.

The pressure within the housing covers can be increased based on the relation between the airtight state within the housing cover and the pressure or the rate of flow of the gas atmosphere during feeding. Increasing the gas atmosphere pressure makes it possible to inhibit the volatilization of components from the glass melt. As a result, it becomes possible to prevent the generation of striae on the glass surface.

The glass flow outlet and the outflow pipe can be made of platinum or platinum alloy, for example, and are desirably heated to about 1,000° C. Thus, to stably maintain this temperature, they are normally insulated by wrapping in a fire-resistant insulating material. The fire-resistant insulating material employed is normally in the form of a bulk or padding of high porosity. Accordingly, since it is technically difficult to render the container around the flow outlet completely airtight, it is also technically difficult to achieve a pressure in the casting area that is substantially greater than atmospheric pressure. Thus, it is difficult to substantially enhance the airtight state within a container by placing both the casting area and the molding area in an airtight container and regulating the atmosphere. By contrast, based on Device 1, it becomes possible to greatly enhance the airtight state within the housing cover in the molding area and greatly increase the gas atmosphere pressure within the housing cover.

When mounting a gas introducing pipe on the upper cover, it is desirable for the gas introducing pipe to be made freely detachable in advance. When varying the atmosphere regulating conditions by means of such a structure, it is possible to switch to a gas feeding pipe from some other type of gas atmosphere feeding device, and instead of mounting the above-described gas introducing pipe on the opening of the upper cover, a window member can be mounted to tightly seal it off. In a section in which a window member has been mounted, it is possible to achieve a state where the interior can be observed while maintaining an airtight state within the housing cover, and it is possible to allow the external atmosphere into the housing cover without mounting a gas introducing pipe.

Molding conditions other than the gas atmosphere, such as the temperature of the casting mold and the flow rate of the flotation gas for floating the glass melt, are desirably optimized while visually observing the molding state. However, in a device where the entire molding device is positioned within a chamber, it is difficult to observe the molding state from directly above, and operating efficiency deteriorates markedly. By contrast, in Devices 1 and 2, the gas introducing pipe can be detached and molding conditions other than the atmosphere determined while observing the molding state from directly above. Subsequently, the gas introducing pipe can be attached and atmospheric conditions optimized.

Additionally, a mechanism separating a glass melt gob corresponding to the weight of a glass preform from the glass melt flowing out of the nozzle is an example of a function that can be imparted to the device for manufacturing glass preforms. As shown in FIG. 1(b), for example, after temporarily stopping the gob casting mold in the casting area, the gob casting mold can be raised vertically upward to within a prescribed distance of the front end of the nozzle and held there. In this state, the lower edge of the glass melt flow flowing out of the nozzle can be received and supported by a concave member of the gob casting mold, and a constriction can be formed between the concave member side and the nozzle side of the glass melt flow. At a prescribed timing, the gob casting mold can be rapidly dropped vertically to separate the glass by means of surface tension at the constriction in the glass melt flow, and the glass melt gob of prescribed weight can be cast on the concave member. This method is known as the drop cutting method. It is a method of separating the glass melt flow without leaving cutting traces. The gob casting mold that is rapidly dropped returns to the height prior to being raised, a glass melt gob is loaded, and the gob casting mold is moved horizontally to the next section and subsequent sections and employed in circulating fashion. However, the method of separating glass melt employed in the present invention is not limited to the drop cutting method; methods of dripping a glass melt droplet from the nozzle into the concave member of a gob casting mold temporarily stopped in the casting area may also be employed. In that case, the gob casting mold may or may not be displaced vertically.

When molding a glass melt gob on a casting mold without flotation, there is a risk that the glass will be locally cooled rapidly at the point of contact and shrink, creating wrinkles in the glass preform. Further, when the glass melt gob contacts the casting mold, rapid cooling of the glass sometimes causes damage known as discontinuity cracking. To prevent such problems, the glass melt gob is desirably floated on the casting mold to mold the glass. Known techniques can be adopted to design the floating method and the gas blow holes. For example, as set forth above, gas blow holes blowing gas exerting upward wind pressure on the glass on the concave member can be provided in the concave member of the gob casting mold. Instead of providing gas blow holes, the molding surface of the casting mold can be formed of a porous material and gas can be blown out through the entire molding surface. Such gas is called flotation gas. By applying the above-described wind pressure, it is possible to float the glass on the concave member. The flotation gas is desirably the same gas as the gas atmosphere, but can be changed as needed. When increasing the pressure of the gas atmosphere, the pressure of the flotation gas is also desirably increased to generate wind pressure capable of floating the glass.

The glass gob can be removed from the gob casting mold in the removal area by a common method such as applying suction to the upper surface of the gob and removing it. The glass gob that is molded in this manner can be gradually cooled to obtain a glass preform.

In the device of the present invention, in contrast to housing the entire device in a container and regulating the atmosphere, the atmosphere can be suitably regulated for each area or subarea. Further, by removing the housing covers and upper cover, it is possible to easily return to a common device in which all steps are conducted in the external atmosphere. It is also possible to position multiple gob casting molds on a table, adjust the height of each casting mold, conduct test runs to confirm operation, and then mount the housing covers and upper cover and begin regulating the atmosphere to readily conduct preparatory operations prior to glass preform manufacturing.

[Methods for Manufacturing Glass Preforms]

The methods for manufacturing glass preforms of the present invention are described next.

The first method for manufacturing glass preforms of the present invention (referred to as Manufacturing Method 1 hereinafter) is:

a method for manufacturing glass preforms, in which multiple gob casting molds are passed sequentially through an area where glass melt is cast in a gob casting mold (casting area), an area where the cast glass melt is molded into a glass preform on a gob casting mold (molding area), and an area in which the molded glass preform is removed from the gob casting mold (removal area); are circulated back to the casting area; and are moved, and during said movement, each of the steps of casting said glass melt, molding it into glass preforms, and removing the glass preforms is sequentially repeated by each gob casting mold to mass produce glass preforms;

characterized in that the atmosphere to which the glass is exposed on the gob casting molds in said casting area, molding area, or removal area is independently regulated relative to the atmosphere of at least one other area.

The second method for manufacturing glass preforms of the present invention (referred to as Manufacturing Method 2 hereinafter) is:

a method for manufacturing glass preforms, in which multiple gob casting molds are passed sequentially through an area where glass melt is cast in a gob casting mold (casting area), an area where the cast glass melt is molded into a glass preform on a gob casting mold (molding area), and an area in which the molded glass preform is removed from the gob casting mold (removal area), are circulated back to the casting area, and are moved, and during said movement, each of the steps of casting said glass melt, molding it into glass preforms, and removing the glass preforms is sequentially repeated by each gob casting mold to mass produce glass preforms;

characterized in that said molding area is divided into multiple subareas, and the atmosphere to which the glass on the gob casting molds is exposed in at least one of said multiple subareas is independently regulated relative to the atmosphere in at least one other subarea and/or at least one other area.

Above-described Manufacturing Method 1 is an example of the use of above-described Device 1 and Manufacturing Method 2 is an example of the use of above-described Device 2.

As set forth above, when molding a gob from glass containing volatile substances, these substances volatize from the surface of the glass at elevated temperature, slightly reducing their concentration. As a result, optically heterogeneous portions called surface striae form on the surface of the glass preform, compromising the optical quality of the glass preform. Typical examples of volatile substances are alkali metal oxides such as $B_2O_3$, $Li_2O$, $Na_2O$, and $K_2O$ and fluorine added as glass components. Volatization of fluorine is particularly marked. Until now, fluorine volatization has been a major impediment to the direct molding of high-quality gobs comprised of fluorine-containing glass from glass melt.

Striae decreasing methods for glass preforms independently developed by the present applicants thus far include the method of molding glass melt in a dry atmosphere and the method of causing a glass melt to flow out in an atmosphere containing hydrocarbon and coating the entire surface of a glass melt gob obtained by separating a quantity corresponding to one glass preform with a carbon film to prevent volatization from the glass surface.

Further methods include the method of increasing in advance the concentration of volatile substances in the atmosphere to reduce volatization from the glass surface and increasing the pressure of the atmosphere to reduce volatization of volatile substances.

When employing these methods, it is desirable to independently regulate the atmosphere in each step; the method of the present invention is a response to such demands.

Gas atmosphere regulation will be specifically described next.

The following are examples of independent regulation of the atmosphere of the molding area or at least one subset of the molding area relative to the atmosphere of the casting area in the present invention:

(i) the method of employing an atmosphere in the casting area in the form of a mixed gas of nitrogen and a hydrocarbon (such as xylene) and molding glass preforms comprised of fluorophosphate glass using dry nitrogen gas in the molding area; and (ii) the method of employing the external atmosphere as the atmosphere in the casting area and increasing the atmospheric pressure in the molding area to greater than the external atmospheric pressure.

The following are examples of independent regulation of the atmosphere of the molding area or at least one subset of the molding area relative to the atmosphere of the removal area:

(iii) the method of employing the external atmosphere as the atmosphere in the removal area and employing dry nitrogen gas as the atmosphere in the molding area;
(iv) the method of regulating the pressure of the dry nitrogen gas in (iii) above to greater than the external atmospheric pressure; and
(v) the method of employing the external atmosphere as the atmosphere in the removal area and incorporating the atmosphere in the container in which the glass melt has been accumulated as the atmosphere in the molding area.

A further example is a method combining the above methods to independently regulate the atmosphere of the molding area or at least one subarea of the molding area relative to the atmosphere of the casting area and the removal area.

The following is an example of independent regulation of the atmosphere to which the glass is exposed on the gob casting mold in a subarea of the molding area relative to the atmosphere in subareas other than the molding area:

(vi) the method of not regulating the atmosphere in at least one subarea in the molding area immediately following the casting area prior to mass producing glass melt preforms, and regulating the atmosphere by inhibiting the volatization of volatile components in other areas (this permits setting the molding conditions by adjusting the temperature of the casting mold and the flow rate of the flotation gas holding the glass melt gob aloft while visually observing through a window, mounted in the gas atmosphere feeding device, the state of the glass melt in the subarea in which no atmospheric regulation is being conducted).

Examples of glasses suited to the devices and methods of the present invention are fluorine-containing glass, $B_2O_3$-containing glass, and alkali metal oxide-containing glass such as those set forth above. An example of a fluorine-containing glass is fluorophosphate oxide glass. This glass is useful as an ultralow dispersion glass material for optical elements. Examples of $B_2O_3$-containing glasses are glasses containing rare earth oxides such as $La_2O_3$. These glasses are useful as high-refractive index glass materials for optical elements. Examples of alkali metal oxide-containing glasses are phosphate glasses. These glasses are useful as high refractive index high dispersion glass materials or low dissipation glass materials for optical elements.

The methods of the present invention are suitable for manufacturing preforms for press molding, particularly for manufacturing preforms for precision press molding. Preforms for press molding require a property permitting relatively low-temperature press molding; that is, a low-temperature softening property. Alkali metal oxides are incorporated to impart a low-temperature softening property to the glass. Since a low-temperature softening property is particularly important in precision press molding applications, alkali metal oxides, particularly extremely volatile $Li_2O$, are often incorporated.

Following precision press molding, since the optically functional surfaces such as lens surfaces of molded articles are not mechanically processed, when striae appear in a portion of the preform surface, the press molded article ends up being defective.

Since overall high quality is demanded of preforms for press molding, particularly preforms for precision press molding, the application of the manufacturing methods of the present invention is particularly desirable.

When employing a glass gob as the above-described preform, the shape of the glass gob is desirably spherical, that of a rotational body, or the like.

In the molding of spherical glass preforms, a casting mold having trumpet-shaped gas blow holes such as that described in Japanese Patent No. 2,746, 567 may be employed.

When forming a carbon film on the surface of the above-described gob, the oxide film is removed by oxidation in the course of annealing the glass gob in the external atmosphere.

Further details of Manufacturing Methods 1 and 2 are as described for Devices 1 and 2 above.

[Method for Manufacturing Optical Elements]

The method for manufacturing optical elements of the present invention is described next.

In the method for manufacturing optical elements of the present invention, a glass preform prepared using a device of the present invention or a glass preform prepared by a method for manufacturing glass preforms of the present invention is heated and precision press molded to obtain an optical element.

Precision press molding, also known as mold optics molding, is a method of forming the shape of an optically functional surface by press molding that is already well known in the technical field of the present invention. Surfaces of optical elements that transmit, refract, diffract, or reflect light rays are called optically functional surfaces. Taking the example of lenses, the aspherical surface of an aspherical lens, and the spherical or other lens surface of a spherical lens correspond to optically functional surfaces. In precision press molding, the molding surface of a pressing mold is transferred precisely to glass to form an optically functional surface by press molding. That is, the optically functional surface requires no finishing in the form of mechanical processing such as grinding or polishing.

Known pressing molds such as pressing molds in which a mold separation film is provided on the molding surface of a mold material such as silicon carbide or an ultrahard material can be employed in precision press molding. Of these, the use of a pressing mold made of silicon carbide is preferred. A carbon-containing film, noble metal alloy film, or the like may be employed as the mold separation film. From the perspectives of durability and cost, a carbon-containing film is desirably employed.

In precision press molding, to keep the molding surface of the pressing mold in good condition, pressing is desirably conducted in a nonoxidizing atmosphere. A nonoxidizing atmosphere such as nitrogen, a mixture of nitrogen and hydrogen, and the like is desirably employed.

Precision press molding methods particularly suited to the method for manufacturing optical elements of the present invention will be described next.

(Precision Press Molding Method 1)

In this method, the above-described preform is introduced into a pressing mold, both the pressing mold and the preform are heated together, and precision press molding is conducted (referred to as "Precision Press Molding Method 1" hereinafter).

In Precision Press Molding Method 1, both the pressing mold and the preform are desirably heated to a temperature at which the glass constituting the preform exhibits a viscosity of from $10^6$ to $10^{12}$ dPa·s and precision press molding is conducted.

The precision press-molded product is desirably removed from the pressing mold after being cooled to a temperature at which the above-described glass exhibits a viscosity of greater than or equal to $10^{12}$ dPa·s, preferably greater than or equal to $10^{14}$ dPa·s, and more preferably, greater than or equal to $10^{16}$ dPa·s.

Based on the above-stated conditions, the shape of the molding surface of the pressing mold can be precisely transferred to the glass and the precision press-molded product can be removed without deformation.

In this method, after heating the above-described preform, it is introduced into a pressing mold and precision press molded. That is, the pressing mold and the preform are separately preheated and the preheated preform is introduced into the pressing mold and precision press molded (referred to hereinafter as Precision Press Molding Method 2).

Based on this method, it is possible to preheat the above-described preform prior to introduction into the pressing mold. This permits the manufacturing of optical elements with good surface precision and without surface defects while shortening the cycle time.

The preheating temperature of the pressing mold is desirably set lower than the preheating temperature of the preform. Preheating the pressing mold to a lower temperature permits a reduction in the wear and tear on the mold.

Since this method does not require heating of the preform in the pressing mold, the number of pressing molds employed can be reduced.

In Precision Press Molding Method 2, preheating is desirably conducted to a temperature at which the glass constituting the above-described preform exhibits a viscosity of less than or equal to $10^9$ dPa·s, preferably a viscosity of $10^9$ dPa·s.

Further, preheating is desirably conducted while floating the above-described preform, with preheating to a temperature at which the glass constituting the above-described preform exhibits a viscosity of from $10^{5.5}$ to $10^9$ dPa·s being preferable and greater than or equal to $10^{5.5}$ dPa·s but less than $10^9$ dPa·s being of even greater preference.

Cooling of the glass is desirably started simultaneously with the start of pressing or during pressing.

The temperature of the pressing mold is adjusted to a temperature lower than the preheating temperature of the above-described preform; it suffices to use a temperature at which the above-described glass exhibits a viscosity of $10^9$ to $10^{12}$ dPa·s as yardstick.

In this method, following pressing, cooling is conducted to a temperature at which the viscosity of the glass is greater than or equal to $10^{12}$ dPa·s before removing the optical element from the mold.

The optical element that is precision press molded is removed from the pressing mold and gradually cooled as needed. When molding a lens, centering and edging may be conducted.

In this manner, based on the present invention, it is possible to manufacture a variety of optical elements, including various lenses such as spherical lenses, aspherical lenses, and microlenses; diffraction gratings; lenses with diffraction gratings; lens arrays; and prisms for applications such as lenses comprising image-pickup optical systems such as digital cameras and film cameras; image-pickup lenses mounted in cellular telephones equipped with cameras; and lenses for guiding light along an optical path employed in data reading and/or writing on optical recording media such as CDs and DVDs. Further, by using copper-containing glass preforms, it is possible to manufacture optical elements having color-correcting functions in the form of semiconductor image-pickup elements.

As necessary, optical films such as antireflective films, fully reflective films, partially reflective films, and films having spectral characteristics may be provided on these optical elements.

According to the method of the present invention, it is possible to reduce the effects of striae and manufacture high-quality optical glass elements with good productivity.

EMBODIMENTS

The present invention is described in greater detail below through embodiments. However, the present invention is not limited to these embodiments.

Embodiment 1

Cullets of glass having a refractive index (nd) of 1.497, an Abbé number (v(nu)d) of 81.6, and primary components in the form of $AlF_3$, $Ca_2F$, $SrF_2$, and BaO were charged to a platinum crucible, melted in an 800° C. nitrogen atmosphere, debubbled and clarified at 1,000° C., and homogenized by stirring to obtain a fluorophosphate glass melt. The glass melt was caused to pass through a platinum pipe of regulated temperature connected to the bottom portion of the crucible and caused continuously flow out of a 660° C. platinum alloy flow nozzle at a flow rate of 0.78 kg/hour. The molding devices shown in FIGS. 1 to 3 were set in the following manner. Nitrogen gas containing little moisture, obtained by vaporizing liquid nitrogen, was employed in the present embodiment.

In the casting area (section 1), a double pipe equipped with gas introduction pipe, made of quartz glass, and connecting to the interior of a quartz glass container enclosing the area around the flow outlet, was inserted. This double pipe served to enclose the flow nozzle and maintain the temperature; it was also used to blow gas toward the diagonal lower center, that is, onto the glass flow and the glass melt beneath it. Using this double pipe, 3 to 5 L/min of nitrogen was caused to flow through the quartz glass container. Additionally, 4 L/min of nitrogen gas was caused to constantly flow through a gas introduction opening positioned in the bottom portion of the housing cover, filling the interior of the housing cover with nitrogen gas. In sections 2 and 3 of the molding area, a freely detachable gas introduction pipe mounting on the upper cover was left off. In the remainder of the molding area (sections 4 to 9), the gas introduction pipes were mounted on the upper cover and 5 to 10 L/min of nitrogen gas was introduced from the upper cover side. In the removal area (section 10), the glass removal opening of the upper cover was opened, exposing the upper portion of the housing cover to the external atmosphere. In the atmosphere replacement area (sections 11 to 12) corresponding to the mold return area, 20 L/min of hydrogen gas was introduced through gas introduction pipes to replace the atmosphere and dilute the external atmosphere entering into the interior of the housing cover in the removal area.

Twelve casting molds were sequentially positioned directly beneath the flow outlet in the above configuration. As shown in FIG. 1(*b*), a casting mold was raised, glass melt flow was received for 6.7 s in the concave member of the casting mold, and the casting mold was rapidly dropped to cut the glass melt flow, placing a 425 mm³ glass melt gob in the concave member of the casting mold. The same operation was repeated and glass melt was sequentially cast in the 12 casting molds once each 7.3 seconds. The glass melt on the casting mold that was moved from the casting area to the molding area was visually observed through holes in the upper cover of sections 2 and 3 to determine the condition of the glass melt. When there was a problem, such as when the shape of the glass melt on the mold was irregular, or the glass melt had fused to the mold, or discontinuity cracking was present, it was possible to adjust the temperature of the casting mold or the rate of flow of flotation gas floating the glass melt gobs so that good glass gobs could be obtained up to this point. The glass melt gob was cooled by cooling gas (nitrogen) and molded into a preform as it moved through the molding area. When the preform arrived in the removal area, the cooling gas flow rate (sections 4 to 9) was adjusted so that the preform was cooled to about 200 to 300° C. In the removal area, the preform was removed by a robotic vacuum suction arm through a hole in the upper cover. However, since the atmosphere in sections 2 and 3 had not yet been adjusted and surface striae had developed, this particular preform was discarded.

After determining molding conditions other than the gas atmosphere in this manner, gas introduction pipes were mounted on the upper cover of sections 2 and 3 and the atmosphere within the housing covers of sections 2 and 3 was adjusted. In the present embodiment, nitrogen was introduced at a rate of 30 L/min in section 2 and 10 L/min in section 3. This type of glass had a tendency to develop surface striae in section 2 where the temperature of the glass melt was high. Accordingly, a particularly large quantity of nitrogen gas was introduced in section 2. As a result, the internal pressure in the housing cover increased in section 2, accelerating cooling of the glass melt surface. The surface striae were due to volatization of the fluorine component. The reduction in surface temperature of the glass melt and the increase in pressure of the molding gas atmosphere reduced volatization of the fluorine component. As a result, surface striae were suppressed. Preforms obtained under these conditions were immersed in matching oil and the surface striae were observed. As a result, thin surface striae were observed only on the outermost perimeter of gobs that tended not to cool, with no striae being observed on other portions. When lenses were press molded from these preforms, the striae were positioned outside the effective radius of the lens, yielding lenses without quality problems.

Embodiment 2

With the exception that the type of gas flowing inside the quartz glass container of the flow outlet was changed as set forth below, the same operation as in Embodiment 1 was conducted to mold preforms. Liquid xylene was prepared in a glass container and two pipes were mounted on the top of the container. One pipe extended to the vicinity of the liquid surface, and the other pipe was short. Nitrogen gas was introduced through the short pipe and nitrogen gas containing xylene vapor was discharged through the long pipe. While causing the nitrogen gas containing xylene vapor to flow at a rate of 3 L/min into the quartz glass container of the flow outlet, 425 mm$^3$ preforms were molded under conditions otherwise identical to those in Embodiment 1. When the nitrogen containing xylene vapor was blown onto the glass melt, the xylene carbonized instantaneously on the hot glass melt surface, forming a carbon film. The formation of the carbon film hindered volatization of the fluorine component from the glass melt. As a result, the generation of surface striae was minimized. The preforms obtained were heat treated in the external atmosphere to burn off the carbon film on the surface. Thinner striae than in Embodiment 1 were observed only on the outermost perimeter of the preforms, but presented no practical problems.

Embodiment 3

With the exception that the glass flowing into the quartz glass container of the flow outlet was changed, the same operation as in Embodiment 1 was conducted to mold preforms. A platinum pipe was inserted into the top of a platinum crucible in which glass melt had been accumulated and the vapor of the glass melt was aspirated. While causing this glass vapor to flow at a rate of 3 L/min through the quartz glass container, 425 mm$^3$ preforms were molded under conditions otherwise identical to those in Embodiment 1. With the flow outlet filled with glass melt vapor, the vaporization of fluorine component from the glass melt was inhibited and only thin striae formed. Striae thinner than those in Embodiment 1 were observed only on the outermost perimeter of the preforms, but presented no practical problems.

Comparative Example 1

The housing cover, upper cover, and quartz glass container around the flow outlet employed in Embodiment 1 were all removed, exposing the glass flow outlet and casting molds to the external atmosphere. In this state, glass melt identical to that employed in Embodiment 1 was caused to flow through the flow nozzle under identical conditions. Glass melt flow was received for 6.7 sec in the concave member of the casting mold and the casting mold was rapidly dropped to cut the glass melt flow, placing a 425 m$^3$ glass melt gob in the concave member of the casting mold. This operation was repeated to sequentially cast glass melt once each 7.3 sec in 12 casting molds. The casting mold temperature and flow rate of flotation gas were identical to those in Embodiment 1. To cool the glass melt, nitrogen gas was blown onto the glass melt from above at a rate of 10 L/m in sections 5 and 7.

Thick, flaky, cloudy surface striae were observed all over the preforms obtained in the present comparative example. When lenses were press molded from these preforms, light scattering was observed due to striae covering the entire lens surface, and the lenses were useless.

The present invention provides glass preforms with reduced striae and high-quality optical elements.

What is claimed is:

1. A device for manufacturing glass preforms, comprising multiple gob casting molds, devices for displacing said gob casting molds and an atmosphere regulating mechanism, wherein said multiple gob casting molds are moved sequentially through a casting area where glass melt is cast in a gob casting mold, a molding area where the cast glass melt is cooled while being held on a gob casting mold to mold a glass preform, and a removal area in which the molded glass preform is removed from the gob casting mold; are circulated back to the casting area; and during said movement, each of the steps of casting said glass melt, molding said glass melt into glass preforms, and removing the glass preforms is sequentially repeated by each gob casting mold to mass produce glass preforms;

wherein said atmosphere regulating mechanism independently regulates an atmosphere to which the glass is exposed on the gob casting molds in said casting area, molding area, or removal area relative to an atmosphere of at least one other area, and wherein said device further comprises:

housing covers with openings at the top, moving together with each of said casting molds when housing said gob casting molds;

an upper cover, covering the openings of said housing covers to increase the air-tightness within said housing covers in said subarea and/or area the atmosphere of which is independently regulated; and a gas feeding device feeding an atmosphere gas into the interior of said housing covers.

2. The device for manufacturing glass preforms of claim 1, wherein the area in which the atmosphere is independently regulated is the molding area.

3. The device for manufacturing glass preforms of claim 1, wherein the area in which the atmosphere is independently regulated is the casting area.

4. The device for manufacturing glass preforms of claim 1, wherein the area in which the atmosphere is independently regulated is the removal area.

5. A device for manufacturing glass preforms, comprising multiple gob casting molds and devices for displacing said gob casting molds, an atmosphere regulating mechanism wherein said multiple gob casting molds are moved sequentially through a casting area where glass melt is cast in a gob casting mold, a molding area where the cast glass melt is cooled while being held on a gob casting mold to mold a glass preform, and a removal area in which the molded glass preform is removed from the gob casting mold; are circulated back to the casting area; and during said movement, each of the steps of casting said glass melt, molding said glass melt into glass preforms, and removing the glass preforms is sequentially repeated by each gob casting mold to mass produce glass preforms;

wherein said atmosphere regulating mechanism divides said molding area into multiple subareas, and independently regulates an atmosphere to which the glass on the gob casting molds is exposed in at least one of said multiple subareas relative to the atmosphere in at least one other subarea and/or at least one other area, and wherein said device further comprises:

housing covers with openings at the top, moving together with each of said casting molds when housing said gob casting molds;

an upper cover, covering the openings of said housing covers to increase the air-tightness within said housing covers in said subarea and/or area the atmosphere of which is independently regulated; and a gas feeding device feeding an atmosphere gas into the interior of said housing covers.

6. The device for manufacturing glass preforms of claim 5, wherein said atmosphere regulating mechanism independently regulates the atmosphere to which the glass on the gob casting mold is exposed in each of said subareas.

7. The device for manufacturing glass preforms in claim 1 or claim 5, wherein height of the housing covers is set so that during movement of the gob casting molds, the height of the opening in the housing cover is maintained constant; and as the gob casting mold moves, the housing cover slides along the bottom surface of said upper cover, maintaining air-tightness within the housing cover in the subarea and/or area the atmosphere of which is independently regulated.

8. A method for manufacturing glass preforms by a manufacturing device comprising:

multiple moveable gob casting molds, multiple housing covers, each with an opening at a top thereof and moveable together with a respective one of said multiple gob casting molds when housing a respective one of said gob casting molds;

an upper cover, operative to cover the opening of said housing covers to provide air-tightness within said housing covers when said housing cover is disposed in different areas and/or disposed in an area the atmosphere of which is independently regulated;

devices for displacing said gob casting molds;

a gas feeding device feeding an atmosphere gas into an interior of said housing covers; and an atmosphere regulating mechanism, said method comprising:

moving said multiple gob casting molds sequentially through a casting area where glass melt is cast in the gob casting molds, a molding area where the cast glass melt is molded into a glass preform on a gob casting mold, and a removal area in which the molded glass preform is removed from the gob casting mold; and circulating said multiple gob casting molds back to the casting area; and during said movement, each of the steps of casting said glass melt, molding said glass melt into glass preforms, and removing the glass preforms is sequentially repeated by each gob casting mold to mass produce glass preforms;

wherein an atmosphere to which the glass is exposed on the gob casting molds in said casting area, molding area, or removal area is independently regulated relative to the atmosphere of at least one other area by said atmosphere regulating mechanism; and wherein air-tightness within said housing covers is provided by said upper cover when said housing cover is disposed in different areas and/or disposed in an area the atmosphere of which is independently regulated.

9. The method for manufacturing glass preforms of claim 8, wherein the area in which the atmosphere is independently regulated is the casting area.

10. The method for manufacturing glass preforms of claim 8, wherein the area in which the atmosphere is independently regulated is the molding area.

11. The method for manufacturing glass preforms of claim 8, wherein the area in which the atmosphere is independently regulated is the removal area.

12. A method for manufacturing glass preforms by a manufacturing device comprising:

multiple moveable gob casting molds, multiple housing covers, each with an opening at a top thereof and moveable together with a respective one of said multiple gob casting molds when housing a respective one of said gob casting molds;

an upper cover, operative to cover the opening of said housing covers to provide air-tightness within said housing covers when said housing cover is disposed in different areas and/or disposed in an area the atmosphere of which is independently regulated;

devices for displacing said gob casting molds;

a gas feeding device feeding an atmosphere gas into an interior of said housing covers; and an atmosphere regulating mechanism, said method comprising:

moving said multiple gob casting molds sequentially through a casting area where glass melt is cast in a gob casting mold, a molding area where the cast glass melt is molded into a glass preform on a gob casting mold, and a removal area in which the molded glass preform is removed from the gob casting mold; and circulating said multiple gob casting molds back to the casting area; and during said movement, each of the steps of casting said glass melt, molding said glass melt into glass preforms, and removing the glass preforms is sequentially repeated by each gob casting mold to mass produce glass preforms;

wherein said molding area is divided into multiple subareas, and an atmosphere to which the glass on the gob casting molds is exposed in at least one of said multiple subareas is independently regulated relative to the atmosphere in at least one other subarea and/or at least one other area by said atmosphere regulating mechanism; and wherein air-tightness within said housing covers is provided by said upper cover when said housing cover is disposed in said subarea and/or disposed in an area the atmosphere of which is independently regulated.

13. The method for manufacturing glass preforms of claim 12, wherein said atmosphere regulation is conducted by independently regulating the atmosphere to which the glass on the gob casting mold is exposed in each subarea.

14. A method for manufacturing optical elements in which an optical element is manufactured using a glass preform manufactured by the method for manufacturing glass preforms described in claim 8 or 12.

* * * * *